455-618 AU 233 EX
FIP8106 OR 2,999,163

EXAMINER
54

S.N. 353,

Sept. 5, 1961 N. C. BEESE 2,999,163

COMMUNICATION SYSTEM

Filed April 30, 1953 2 Sheets-Sheet 1

INVENTOR
N. C. BEESE
BY
ATTORNEY

Sept. 5, 1961 N. C. BEESE 2,999,163

COMMUNICATION SYSTEM

Filed April 30, 1953 2 Sheets-Sheet 2

INVENTOR
N. C. BEESE.
BY
ATTORNEY

United States Patent Office 2,999,163

Patented Sept. 5, 1961

2,999,163

COMMUNICATION SYSTEM

Norman C. Beese, Verona, N.J., assignor to Westinghouse Electric Corporation, East Pittsburgh, Pa., a corporation of Pennsylvania Filed Apr. 30, 1953, Ser. No. 352,271

5 Claims. (Cl. 250—86)

This invention relates to infrared communication systems and, more particularly, to a portable infrared radiation communication system wherein a modulated infrared beam is produced with a minimum of power consumption.

Heretofore portable infrared radiation communication systems have generally voice modulated the infrared carrier by some sort of vibrating mirror mechanism. Such systems are described in Journal of the Optical Society of America, vol. 38, No. 3, March 1948, "Survey of Near Infrared Communication Systems," pp. 253–268. On pages 258, 261 and 264 of this publication there are disclosed three separate systems for modulating an infrared beam, all of which systems are essentially mechanical in nature, require tripod or other solid base mounting, are relatively fragile, and require relatively large amounts of electrical power for operation. As can be readily seen, these heretofore known infrared modulating systems do not particularly meet the requirements of a portable infrared communication system wherein ruggedness and low power consumption are of primary importance. The requirement of low power consumption is of particular importance because of the relatively heavy batteries which must be carried to operate these portable units.

It is the general object of my invention to avoid and overcome the foregoing and other difficulties of and objections to prior art practices, by providing a light-weight, portable, secure, light beam communication system wherein the electrical power requirements are minimized.

Another object of my invention is to provide an infrared communication system wherein the infrared beam may be modulated by using an electrostatic modulating means having very small electrical power consumption.

Still another object of my invention is to provide a modulated infrared communication system wherein the modulated infrared radiation is emitted substantially at the focal point of a hollow paraboloidal deflector.

Yet another object of my invention is to provide a modulated infrared radiation communication system wherein the modulated infrared transmitter utilizes primary and secondary reflectors for forming the infrared beam.

A still further object of my invention is to provide a phosphor coated hollow spherical anode for converting modulated electrical energy into modulated infrared energy in combination with a hollow paraboloidal segment reflector for forming an infrared beam, which anode may be provided with radiator fins.

Yet another object of my invention is to provide a voice modulated light source.

The aforesaid objects of my invention, and other objects which will become apparent as the description proceeds, are achieved by providing an electrostatic modulating means for modulating an electron beam, exciting an infrared emissive phosphor with this modulated electron beam and forming the resulting modulated infrared radiation into an infrared beam for transmitting voice communication by means of an infrared carrier.

For a better understanding of the invention, reference should be had to the accompanying drawings wherein.

Figures 1, 2, 5:
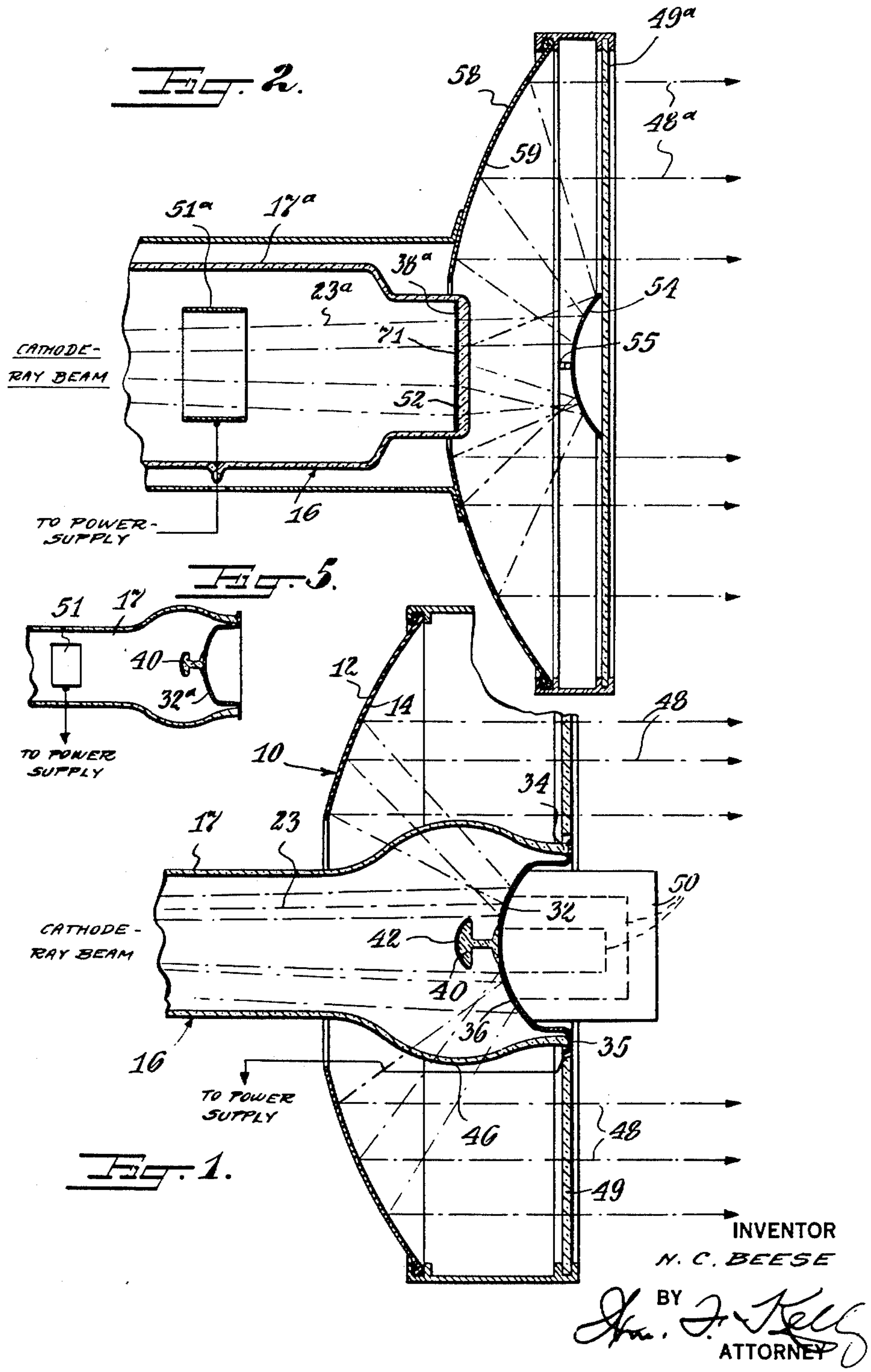
FIG. 1 is an elevational view, partly in section, of a portion of the electron gun, the electron gun anode with an infrared emitting phosphor coating, and paraboloidal segment reflector, which represents the preferred embodiment of my invention.
FIG. 2 is an elevational view, partly in section, of a portion of the electron gun, infrared emissive phosphor coating, secondary hollow spherical reflector, and primary hollow paraboloidal segment reflector, which illustrates a modification of the preferred embodiment.
Figures 3, 4:
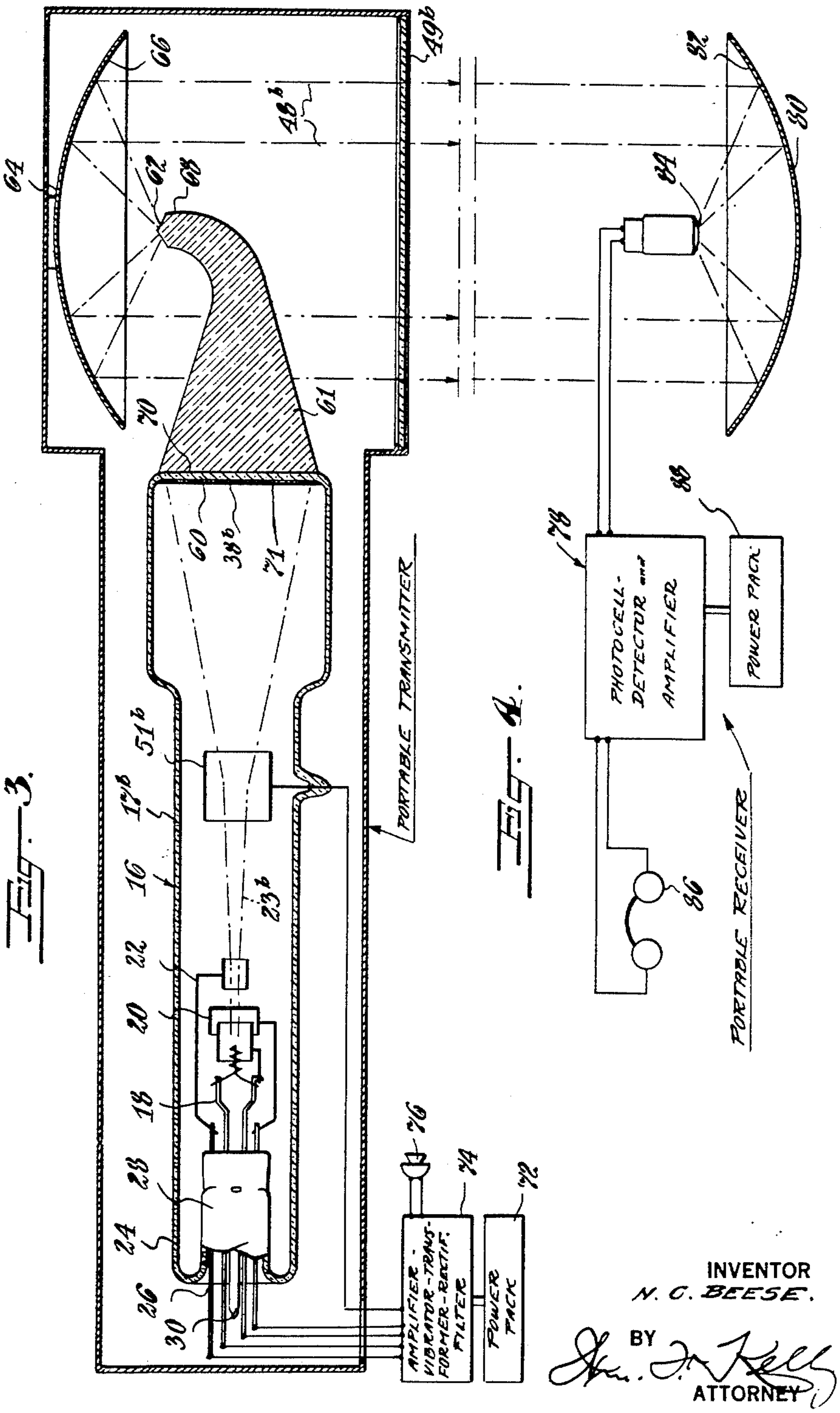

FIG. 3 is an elevational view, partly in section, partly in block diagram, illustrating the electron gun, infrared emissive phosphor coating, infrared conducting and focusing means, and hollow paraboloidal reflector of a further modification of the preferred embodiment. Shown in block diagram is the modulator-vibrator-transformer-retifier-filter unit and microphone together with the necessary power pack containing the batteries for my portable unit;

FIG. 4 is an elevational view, partly in section, and partly in block diagram, of a portable receiver for use with my portable modulated infrared transmitter;

FIG. 5 is an elevational view, partly in section, of a portion of the electron gun, illustrating a modification of the preferred embodiment, wherein the electron gun anode is located intermediate the electron gun envelope ends.

Although the principles of my invention are broadly applicable to any system requiring modulation of electromagnetic waves which can be transmitted on line of sight, the invention is usually employed in conjunction with a modulated infrared communication system, and hence it has been so illustrated and will be so described.

With specific reference to the form of the invention illustrated in the drawings, the numeral 10 indicates the preferred embodiment of my invention which consists generally of a hollow paraboloidal segment reflecting mirror 12 having a reflecting surface 14 on its concave or inner surface. The electron gun 16 is shown in part in FIG. 1 and in its entirety in FIG. 3 with a slightly modified envelope. The gun 16 consists of a substantially tubular evacuated envelope 17 which may be fabricated of a vitreous material such as "Pyrex" glass, a cathode 18 which may be fabricated of a thermionic emissive alkaline earth material coated over an overwound tungsten filament for generating thermionic emission, control grid 20 and accelerating grid 22. "Pyrex" is a Corning Glass Works trademark for a glass consisting of approximately 80.5% silicon dioxide, 13.0% boric oxide, 3.8% sodium oxide, 0.5% potassium oxide and 2.2% aluminum oxide. The control grid 20 is interposed between the cathode 18 and accelerating grid 22 for quantitatively increasing or decreasing the thermionic emission from cathode 18 in response to a modulating signal applied to control grid 20, as hereinafter explained.

The accelerating grid 22 desirably has the configuration of a hollow, open-ended cylinder and is positioned so that the thermionic emission passing control grid 20 will intersect the open ends of the grid 22 and axially pass through this grid 22 for forming and accelerating this thermionic emission into an electron beam 23. During operation a positive potential of 10 to 100 volts, with respect to the cathode 18, is normally applied to accelerating grid 22. The cathode 18 is located substantially at one end 24 of the tubular envelope 17, and the control grid 20 is axially displaced from the cathode and in operative proximity thereto. The accelerating grid 22 is likewise axially displaced from the control grid 20 and is in operative proximity thereto. The cathode, control grid and accelerating grid are supported by lead-in conductors 26 sealed through a reentrant stem press 28 located approximately at the end 24 of envelope 17. Also sealed through the reentrant stem press 28 is tipped-off exhaust tubulation 30 through which the envelope 17 is exhausted during fabrication.

The electron gun anode 32, as shown in the preferred embodiment of my invention, as illustrated in FIG. 1, is located substantially at the other end 34 of the envelope 17. This anode 32 which may be fabricated of "Kovar," which is a Westinghouse Electric Corporation trademark for an iron-base alloy containing substantially 29.8% nickel, 15.5% cobalt, 0.22% manganese and less than 0.1% carbon. The anode 32 has the approximate configuration of a hollow spheroidal sector, with convex and concave surfaces, and is adapted to be sealed to the envelope end 34 at the periphery 35 of the hollow spheroidal sector anode, and is so positioned with respect to envelope 17 that the convex side 36 is presented to the evacuated interior of envelope 17. The inner or convex surface 36 of anode 32 is coated with a phosphor 38 which, when excited by electron bombardment, will emit infrared radiation. Phosphors which are suitable for coating anode 32 are cadmium selenide—copper activated, which is the preferred phosphor, cadmium sulphide—copper activated, and cadmium telluride—copper activated.

Cadmium selenide—copper activated phosphor, is prepared in the following manner: Cadmium selenide is precipitated in a weak hydrochloric acid solution with hydrogen selenide which is prepared from aluminum selenide. Copper activator, in amounts of less than 2 parts per thousand of cadmium selenide, is mixed with the phosphor in the wet condition to insure uniform distribution. The dried powder is mixed with a flux, principally potassium chloride and then fired at about 700° C. in a furnace filled with an inert gas such as nitrogen and operating at pressures of several hundred to a thousand or more atmospheres. The flux is then washed out of the phosphor and dried. Grain size can be controlled to yield a large proportion of the phosphor with particles 1 to 3 microns in diameter, which is the most desirable size. When this cadmium selenide—copper activated phosphor is excited by ultraviolet, X-rays or electron bombardment, it emits radiations from the visible spectrum to the near infrared to about 1.8 microns with peaks of emission at about 0.86 micron and 1.3 microns. These principal emission bands occur in regions where atmospheric absorptions caused by water vapor, carbon dioxide or ozone are low. Hence the normal atmosphere is quite transparent for these radiations, which can be used for communication purposes or signalling with good efficiency.

The anode 32 is normally maintained at a positive potential of 10–15 kv. in order to impart the necessary phosphor excitation velocity to the electron beam 23. This high potential is obtained by means of a vibrator activated by a small battery and a high voltage transformer, which high voltage is rectified and filtered, as is common in the art.

In the preferred embodiment, as illustrated in FIG. 1, an electron deflector 40, located at the approximate geometric center of anode 32, and at the approximate center of the electron beam 23, is required to spread the electron beam 23 in an annular pattern over the phosphor coating 38, for if the electron bombardment were concentrated about the center of the phosphor coating 38, hot spots and inefficient emission would result. Also, where the electron beam 23 is spread over anode 32 in an annular pattern, the infrared radiation emitted may be more efficiently utilized, since the excited portion of phosphor coating 38 will be more parallel to the reflecting surface 14 of reflector 12 with resulting improved optical efficiency. Such an electron deflector may be fabricated of quartz having a coating 42 of beryllium or carbon, both of which have an electron secondary emission less than 1. Thus, during operation the electron beam 23 will impart a strong negative charge to the electron deflector coating 42 which will repel and thus spread electron beam 23 in an annular zone over the phosphor coating 38. Of course, it is necessary to insulate the coating 42 from anode 32 and the quartz deflector body 40 serves this purpose.

The hollow paraboloidal segment mirror 12 is silvered or aluminized on its inner or concave reflecting surface 14 and is so positioned that its axis substantially coincides with the axis or center line of envelope 17 and the axis or center line of the hollow spheroidal sector anode 32. The reflector 12 is located entirely externally of the envelope 17, and intermediate the ends 24 and 34 of envelope 17. The reflector 12 is also so axially positioned that the inner or reflecting surface 14 faces toward the anode 32 and is thus in receptive proximity to this inner or convex surface 36 to receive the modulated infrared radiation emitted by phosphor coating 38.

To facilitate more efficient infrared generation by permitting the use of the larger anode 32, a portion 46 of the envelope 17 adjacent the envelope end 34 may be belled to accommodate the larger anode and must, of course, be infrared transparent. In addition, this belled portion 46 of envelope 17 permits infrared radiation emitted by phosphor coating 38 to pass through the vitreous belled portion 46 more nearly perpendicularly, thus minimizing infrared reflection loss.

The hollow paraboloidal configuration of mirror 12 will form the modulated infrared radiation emitted by phosphor coating 38 into a modulated infrared beam 48 which will necessarily contain some visible radiation, as the infrared radiating phosphors, theretofore enumerated, all contain some limited amounts of visible radiation. To eliminate this visible radiation an infrared filter 49 is placed across the infrared beam 48 formed by reflector 12, infrared filters being common in the art.

As a possible modification of the embodiment of my invention, as shown in FIG. 1, radiating fins 50 may be added to the concave side of the anode 32 in order to dissipate the heat generated by the electron bombardment. This will allow more electron beam power to be placed on an equivalent area of phosphor and a more efficient infrared source will result.

As a possible modification of my invention, as illustrated in FIG. 1, the anode may be located intermediate the phosphor coating 38 and the accelerating grid 22. Such an anode 51, shown in FIG. 5, desirably has the configuration of an open-ended, hollow cylinder and is so positioned that the electron beam 23 will intersect the open ends of the anode 51 and axially pass through this hollow anode 51. The end of the envelope 17, in such a modified embodiment, may still be a phosphor coated "Kovar" hollow spheroid 32*a* having an electron deflector 40 at its approximate geometric center. In such an embodiment the phosphor coated envelope end 32*a* would not have a positive potential applied to it, as in the preferred embodiment.

Shown in FIG. 2 is a further modification of the preferred embodiment of my invention, shown in FIG. 1. In this modification the phosphor coating 38*a* which is preferably cadmium selenide—copper activated phosphor, as heretofore noted, is applied on an infrared transparent flat surface 52, comprising the end of envelope 17*a*, which surface 52 may be comprised of any infrared transparent material, such as "Pyrex" glass. The secondary reflector 54 has a substantially hollow spherical sector configuration with a convex reflecting surface, is located externally of the envelope 17*a*, and is centered approximately on the axial extension of envelope 17*a* by a spacing and securing support 55 with its convex reflecting surface 56 in receptive proximity to phosphor-coated flat surface 54 in order to receive infrared radiation emitted from the phosphor 38*a*. A hollow paraboloidal segment primary reflector 58 having a reflective concave surface 59 is positioned around the end 52 of envelope 17*a* and in receptive proximity to the convex side 56 of secondary reflector 54 to receive infrared radiation reflected from this secondary reflector, for forming this radiation into a modulated infrared beam 48*a*. An infrared filter 49*a* is placed across the infrared beam 48*a* formed by the reflector 56 to eliminate visible radiation, as heretofore noted. The primary and secondary reflectors 58 and 54 are both rigidly fixed with respect to envelope 17*a*.

In the embodiment of my invention as illustrated in FIG. 2, the anode 51*a* is preferably located intermediate the ends of envelope 17*a*, as in the heretofore-noted modification of the preferred embodiment of my invention. This anode 51*a* is maintained at a potential of approximately 10–15 kv. which potential is supplied by a battery-vibrator-transformer-rectifier-filter unit, as heretofore noted. The flat surfaced end 52 may be approximately 1 inch in diameter, in order that the electron beam 23*a* may be spread over a sufficient area to avoid local hot spots which will damage the phosphor coating 38*a* and destroy its efficiency. The infrared transparent end 52 of envelope 17*a* is reduced in diameter from the normal diameter of envelope 17*a* so that the infrared radiation emitted by phosphor coating 38*a* may be better beamed on secondary reflector 54. Were the phosphor coating 38*a* applied over a larger area, when used in conjunction with a secondary reflector type of design, as illustrated, there would be an excess of infrared radiation lost through scattering, and in addition, the infrared radiation intrinsic brightness would be diminished and collimating the infrared beam 48*a* would be more difficult.

In FIG. 3 is shown another possible modification of the preferred embodiment of my invention wherein the phosphor coated infrared transparent end 60 of envelope 17*b* is substantially flat. The phosphor coating 38*b* is preferably calcium selenide—copper activated, as heretofore noted. In this modification, the end 60 is expanded in diameter from the rest of the envelope 17*b*, so that the phosphor coating 38*b* may be applied over a greater area, which may be over 2 inches in diameter, in order to minimize local hot spots. As heretofore noted, infrared radiation emitted from such a relatively large area is relatively difficult to focus on a parabolic reflector where a secondary reflector type of design is used, but this difficulty has been overcome by providing an infrared transparent conducting and focusing means 61 which focuses the infrared radiation emitted by phosphor coating 38*b* at approximately the focal point 62 of a reflector 64. Such a reflector preferably has the configuration of a hollow paraboloid with its reflecting surface on the concave side 66. The infrared transparent focusing means 61 may have the approximate configuration of a cone wherein the apex 68 of the cone is bent through approximately 90° to facilitate its being positioned approximately at the focus 62 of reflector 64. The base 70 of the focusing means 61 substantially corresponds in configuration to the end 60 of envelope 17*b*, and may be cemented to the end 60 with a transparent thermoplastic cement, as is common in the art, in order to avoid reflection losses at the two surfaces. The focusing means 61 may be fabricated of methyl methacrylate resin known under the trade name "Lucite" and manufactured by E. I. du Pont de Nemours Co. "Lucite" is suitable for visible light and for certain regions of the near infrared, because of its high optical transparency and its highly polished surfaces. Other transparent plastics or quartz may be used as a substitute for "Lucite," if desired.

The modulated infrared beam 48*b* formed by paraboloidal reflector 64 is necessarily filtered by an infrared filter 49*b*, as heretofore noted. The electron beam 23*b* may be spread over phosphor coating 38*b* by means of anode 51*b*, which anode has a positive potential of 10–15 kv. The anode 51*b* is so axially positioned with respect to phosphor coating 38*b* as to spread electron beam 23*b* almost to the periphery of phosphor coated end 60 of envelope 17*b*.

In either of the embodiments, as shown in FIGS. 2 and 3, the phosphor coatings 38*a* and 38*b* may be covered on its interior surface with a thin sheet of electron beam transparent aluminum 71, shown in each figure, to enhance the amount of modulated infrared radiated in a useful direction, i.e., toward the paraboloidal reflectors.

The power pack 72, shown in block diagram, contains the necessary primary or secondary type batteries, and is used in all embodiments illustrated. The low voltage D.C. is fed into a vibrator-transformer-rectifier-filter unit 74, which units are common in the art, for converting the low voltage D.C. to the high voltage D.C. required for the operation of my unit. The microphone 76 may be any conventional type, and produces the modulation signal which is amplified as necessary before being applied to control grid 20, by conventional amplifying means, shown in block diagram 74.

In FIG. 4 is shown a receiver unit 78 for use with my portable transmitter unit as illustrated in FIGS. 1, 2 and 3. This receiver unit 78 consists of a hollow paraboloidal reflector 80 with a reflecting surface on the inner or concave side 82. When this reflecting surface 82 is pointed toward modulated infrared beam 48 emanating from the beam-forming paraboloid reflector of the transmitter, the modulated infrared radiation will be focused at photoconductive cell 84 positioned approximately at the focus of reflector 80. Such a photoconductive cell may be of the thallium sulfide, lead sulphide or lead selenide types, as are well-known in the art. The output of the photoconductive cell 84 will be modulated as was the received infrared beam 48 and this cell thus serves as a detector for the voice modulation. The photoconductive cell 48 output is amplified by conventional amplifying means and applied across a head phone 86, as illustrated in block diagram in FIG. 4. The necessary power pack 88 for the receiver unit is also shown in block diagram. The receiver may be equipped with headphones 88 as shown, or with a small speaker.

*Operation*

The electrical power for my unit is provided by a battery pack, shown in block diagram in FIG. 3. The low voltage D.C. is converted into the high potential D.C. needed for the anodes, and the intermediate D.C. potential required for the accelerating grid may be supplied by a voltage divider means, as is common in the art. The modulation energy is supplied as heretofore explained, and is applied across control grid 20. This control grid is essentially electrostatic in its operation, and consumes only minute amounts of power in modulating the thermionic emission from cathode 18.

Control grid potentials of the normal sine wave type may be used, and if it is desired to increase the effective range without increasing the power consumption, it is possible to utilize pulses of short duration in the grid circuit. Such a system is described in my copending application, Serial No. 256,915, filed November 17, 1951, entitled "Discharge Lamps and Power Amplification of Signals Therefrom," and assigned to the present assignee.

To energize the cathode only a low voltage D.C. is required and this may be supplied by the battery pack. As heretofore noted, the thermionic emission generated by the cathode 18 is quantitatively controlled by the control grid 20 which modulates the electron beam 23. The electron beam 23 is formed and accelerated by the relative positioning of the cathode 18, control grid 20 and the positive potential of the accelerating grid 22 and the anodes 32 or 51, 51*a* and 51*b*.

When the electron beam 23 bombards the infrared emissive phosphor coating 38, the resulting infrared radiation is modulated as was the modulated phosphor excitation electron beam 23. As is obvious, no electron beam scanning of the phosphor coated screen is necessary, since the excitation electron beam 23 is modulated and the resultant radiation from the phosphor screen is correspondingly modulated. The modulated infrared beam 48 is formed by the hollow paraboloidal transmitter reflector means, and all visible radiation present is filtered out by means of an infrared filter 49. Such an infrared transmitter system consumes relatively little power, of the order of 5 watts, and such relative small power consumption is necessary to a light-weight portable unit which must have long battery life. In spite of the relatively low power consumption, however, the transmitter unit can furnish communication over ranges 1 to 2 miles where the infrared carrier is voice modulated.

It will be recognized that the objects of the invention have been achieved by providing a relatively low power infrared transmitter which utilizes an electrostatic modulating means for modulating the electron beam 23. This electron beam 23 in turn excites an infrared emissive phosphor 38, and the resulting modulated infrared radiation is formed into an infrared beam 48 by a paraboloidal reflecting means 12.

Several alternative structures are also presented. To increase the effective range of my system without increasing the power consumption, the voice modulation may be replaced by an interrupted keyed signal of constant modulation amplitude or the carrier may be interrupted and unmodulated.

The system may also be converted into a modulated ultraviolet radiation transmission system by replacing infrared emissive phosphors with ultraviolet emissive phosphors, examples of such phosphors being calcium zinc phosphate—thallium activated, or barium silicate—lead activated. In such a system, the thallium sulfide or lead sulfide photocell of the receiver unit must be replaced by a photocell which is readily excited by ultraviolet radiation, examples of such photocells being phototubes with type S5 response.

It is also possible to similarly modulate a visible light carrier, where security is not a consideration. In such a system the emitting phosphor of the transmitter could be magnesium tungstate and the receiver photocell could be cells with type S-3 characteristic response.

While in accordance with the patent statutes, one best known embodiment of the invention has been illustrated and described, it is to be particularly understood that the invention is not limited thereto or thereby.

I claim:

1. A modulated infrared radiation generating device comprising in combination, a double-ended evacuated envelope whose axis intersects said envelope ends, electrodes sealed within said envelope and adapted for forming a modulated electron beam, said electrodes comprising a cathode located substantially at one of the ends of said envelope and adapted for excitation for generating thermionic emission, a control grid axially displaced from said cathode and in operative proximity thereto and adapted to have a modulating signal applied thereto for modulating the thermionic emission from said cathode, an accelerating grid axially displaced from said control grid and in operative proximity thereto and adapted to have a potential applied thereto for accelerating said thermionic emission modulated by said control grid, an anode comprising the other end of said envelope having a substantially hollow spherical sector configuration with concave and convex surfaces and adapted to have a potential applied thereto for further accelerating said modulated thermionic emission accelerated by said accelerating grid, said electron beam being finally formed by the said modulated thermionic emission generated by said cathode as modulated by said control grid and accelerated by said accelerating grid and said anode, said convex surface of said anode being within said envelope and having an infrared emitting phosphor coated thereon, a coated electron deflector projecting from the approximate geometric center of the convex surface of said anode and into said evacuated envelope, said electron deflector coating having an electron secondary emission less than 1, a reflector located externally of said envelope and having the configuration of a hollow paraboloidal segment with inner and outer surfaces and with the axis of said reflector substantially coinciding with the axis of said envelope, said reflector inner surface being in receptive proximity to said anode convex surface for receiving infrared radiation emitted from said phosphor coating, said inner surface of said reflector being reflective for forming a substantially parallel infrared beam, and an infrared filter external of said envelope for intersecting all portions of said infrared beam.

2. A portable modulated infrared radiation generating device comprising in combination, a double-ended evacuated envelope whose axis intersects said envelope ends, emission means adjacent one end of and within said envelope and operable to produce thermionic emission, modulating means within said envelope and adjacent said emission means and operable when a modulating signal is impressed thereon to modulate said thermionic emission, accelerating means within said envelope and adjacent said modulating means and operable to accelerate and form said thermionic emission into an electron beam, the other end of said envelope comprising an anode having a substantially hollow spherical sector configuration with concave and convex surfaces, said anode being disposed in the path of said electron beam and operable to further accelerate and form said electron beam, said anode convex surface being within said envelope and having coated thereon an infrared emissive phosphor for emitting modulated infrared radiation when excited by said modulated electron beam, an electron deflector having a coating and projecting from the approximate geometrical center of said anode and into said evacuated envelope, said electron deflector coating having an electron secondary emission less than 1, a reflector located externally of said envelope and having the configuration of a hollow paraboloidal segment with a reflective inner surface and an axis, the axis of said reflector substantially coinciding with the axis of said envelope, said inner surface of said reflector being in receptive proximity to said anode for receiving modulated infrared radiation emitted from said phosphor coating for forming a substantially parallel modulated infrared beam, and an infrared filter external of said envelope for intersecting all portions of said infrared beam.

3. A portable modulated infrared radiation generating device as in claim 2, wherein said anode has attached thereto radiator fins on its concave surface for dissipating heat.

4. A modulated infrared radiation generating device as in claim 2, wherein said anode has a substantially larger area than the other end of said envelope, a portion of said envelope being partially enclosed by said external reflector, and said enclosed portion being infrared transparent and having a belled configuration.

5. An anode and infrared converter for a voice modulated infrared generating device having a substantially hollow spherical sector configuration with convex and concave surfaces and adapted for having applied thereto a potential, said convex side of said anode having an infrared emissive phosphor coated thereon, a coated electron deflector projecting from the approximate geometrical center of said convex surface of said anode, and said electron deflector coating having an electron secondary emission less than 1.

References Cited in the file of this patent

UNITED STATES PATENTS

| | | |
|---|---|---|
| 2,466,329 | Samson et al. | Apr. 5, 1949 |
| 2,482,151 | Boyle | Sept. 20, 1949 |
| 2,495,035 | Szegho | Jan. 17, 1950 |
| 2,521,571 | Du Mont et al. | Sept. 5, 1950 |